United States Patent
Balchen

(10) Patent No.: US 6,182,431 B1
(45) Date of Patent: Feb. 6, 2001

(54) FRUIT PICKING APPARATUS

(76) Inventor: Bruce A. Balchen, Box 299, Dauphin (CA), R7N 2V2

(*) Notice: Under 35 U.S.C. 154(b), the term of this patent shall be extended for 0 days.

(21) Appl. No.: 09/369,377

(22) Filed: Aug. 6, 1999

(51) Int. Cl.[7] .................................................. A01D 46/24
(52) U.S. Cl. .............................. 56/332; 56/339; 56/337
(58) Field of Search ................................. 56/239, 328.1, 56/329, 331, 332, 333, 335, 336, 337, 338, 339, 340

(56) References Cited

U.S. PATENT DOCUMENTS

| | | | |
|---|---|---|---|
| 1,480,825 | * 1/1924 | Le Nove | 56/339 |
| 3,638,409 | * 2/1972 | Kuska | 56/332 |
| 4,928,461 | * 5/1990 | King | 56/339 |
| 5,463,859 | * 11/1995 | Perry | 56/332 |
| 5,787,698 | * 8/1998 | Rushing | 56/332 |
| 5,857,316 | * 1/1999 | Murdock | 56/332 |

* cited by examiner

Primary Examiner—Robert E. Pezzuto
(74) Attorney, Agent, or Firm—Adrian D. Battison

(57) ABSTRACT

An apparatus for picking fruit comprises an elongate tube in which fruit is collected, a handle attached to the tube for enabling fruit to be picked from trees, a first plate at a top end of the tube for engaging a branch, the plate having a slot arranged to receive a stem of the fruit, a slidable member with an aligned slotted plate arranged to slide within the tube so that the plates move in opposite directions to break the fruit from its stem. The tube collects the fruit which can be seen through an opening. The slide is operated against a spring by a string extending along the handle.

9 Claims, 6 Drawing Sheets

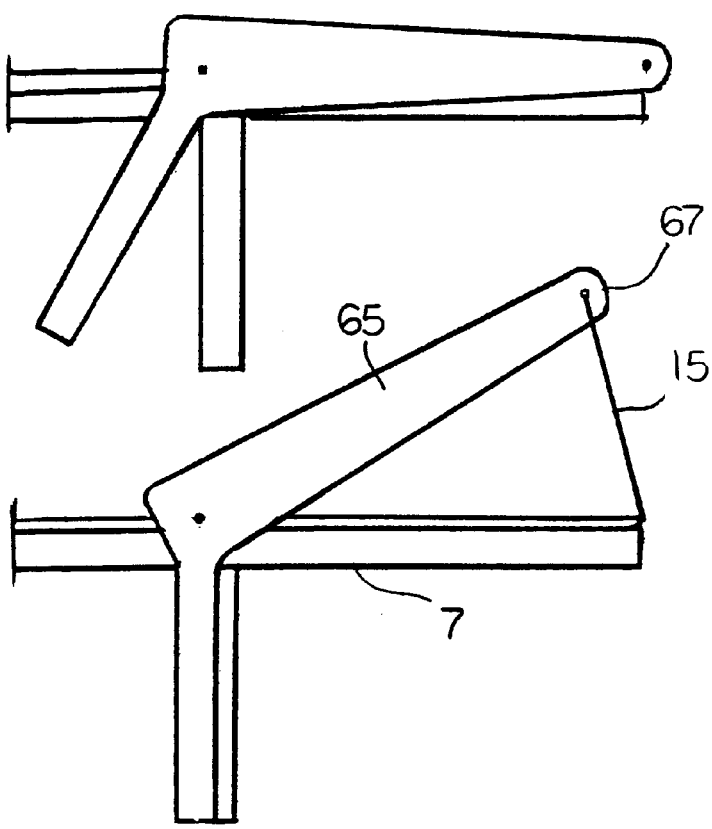
FIG. 8
FIG. 9
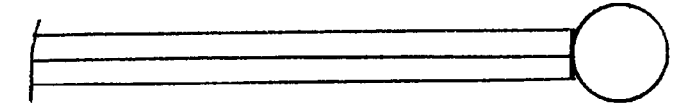
FIG. 10
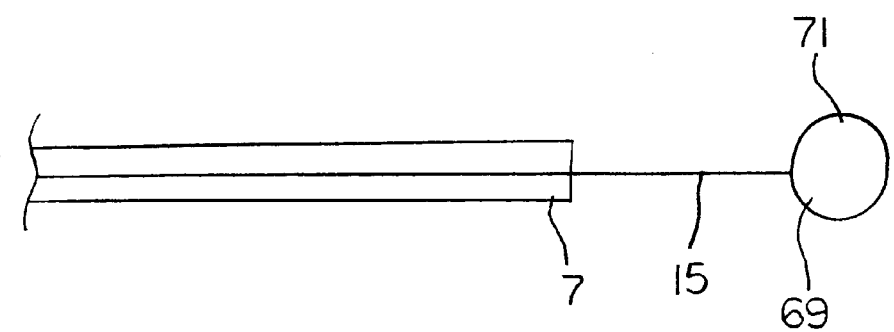
FIG. 11

FRUIT PICKING APPARATUS

FIELD OF THE INVENTION

The present invention relates to an apparatus for picking fruit from a tree or the like.

BACKGROUND OF THE INVENTION

Generally, harvesting fruit such as oranges or apples and many other types of fruits requires a person either to climb a ladder to remove the fruit or to use an apparatus to remove the fruit. Conventionally an apparatus of this type has an elongate handle which allows the operator to raise an end to the fruit and pick the fruit from the tree. Some examples of this type include U.S. Pat. No. 5,083,418 (Reece), U.S. Pat. No. 3,638,409 (Kuska), U.S. Pat. No. 4,471,604 (Soffer), U.S. Pat. No. 5,787,698 (Rushing), U.S. Pat. No. 4,959,949 (Weir) and U.S. Pat. No. 5,249,412 (Morgan). The above U.S. patents utilise an elongate handle generally in the form of a pole and to catch the fruit after the fruit has been picked. A problem with the above U.S. patents is that there is a potential to damage the fruit through the lateral movement of the entire apparatus and there is no support of the branch in which the fruit is located which makes pulling the fruit from the tree sometimes difficult.

Some other examples of fruit harvesters include U.S. Pat. No. 4,388,798 (Gerber) that has a vacuum at an end of an elongate tube which utilises the suction from the vacuum to remove the fruit from the tree. There is a potential for damage to the fruit through the suction, the apparatus has a large and awkward vacuum which has to be moved around the field, different sizes of fruit cannot be pulled through the tube and different degrees of ripeness of the fruit make a stronger vacuum a necessity for ensured removal of the fruit.

U.S. Pat. No. 3,854,273 (Rosenberg) and U.S. Pat. 5,280,697 (Miller) utilise a cutter bar for removing the fruit from the tree which potentially can damage the fruit since the cutter bar may puncture the fruit.

SUMMARY OF THE INVENTION

It is one object of the present invention to provide a fruit picker which supports the fruit on the tree as well as supporting the branch in which the fruit is located and gently pulls the fruit from the tree. Such an apparatus could lower the amount of damaged fruit at harvest and make the picking quicker and with less effort.

According to one aspect of the invention there is provided an apparatus for picking fruit comprising;

an elongate tube in which fruit is collected;

a handle attached to the tube for enabling fruit to be picked from trees;

a first plate at a top end of the tube for engaging a branch, the plate having a slot arranged to receive a stem of the fruit;

a slidable member arranged to slide within the tube;

a rudder arranged to guide the slidable member within the tube;

and a second plate on the slidable member having a slot which is aligned with the slot on the first plate to receive the stem of the fruit, the slidable member having a first position in which the second plate is adjacent the first plate and a second position in which the second plate is pulled rearwardly from the first plate, whereby in first position the first plate engages the branch and the second plate engages the fruit so that the plates are located between the branch and the fruit and whereby in the second position the second plate pulls the fruit away from the branch as the first plate is positioned against the branch causing the stem to break releasing the fruit into the tube.

Preferably a spring biasing arrangement pulls the slidable member to the first position, the spring biasing arrangement includes a spring which is attached to the rudder and is arranged to stretch when the slidable member is pulled rearward into the second position and compress when the slidable member is in the first position.

Preferably a string is attached to the rudder and extends through the handle for pulling the slidable member into the second position, the string has a pulling device at the end of the handle for pulling the string.

Preferably the handle is a tube having a hollow interior in which the string extends therethrough.

Preferably the tube has a containment portion wherein the fruit is contained and has an open portion so that an operator can see how much fruit has been picked.

Preferably the rudder is attached to the slidable member and is located within a guide slot on the tube.

BRIEF DESCRIPTION OF THE DRAWINGS

One embodiment of the invention will now be described in conjunction with the accompanying drawings in which:

FIG. 8 is a side elevational view showing a handle of the present invention.

FIG. 9 is a side elevational view showing the handle in a second position of the present invention.

FIG. 10 is a side elevational view showing an alternate embodiment of the handle of the present invention.

FIG. 11 is a side elevational view an alternate embodiment of the handle in a second position of the present invention.

In the drawings like characters of reference indicate corresponding parts in the different figures.

DETAILED DESCRIPTION

Figure 1:
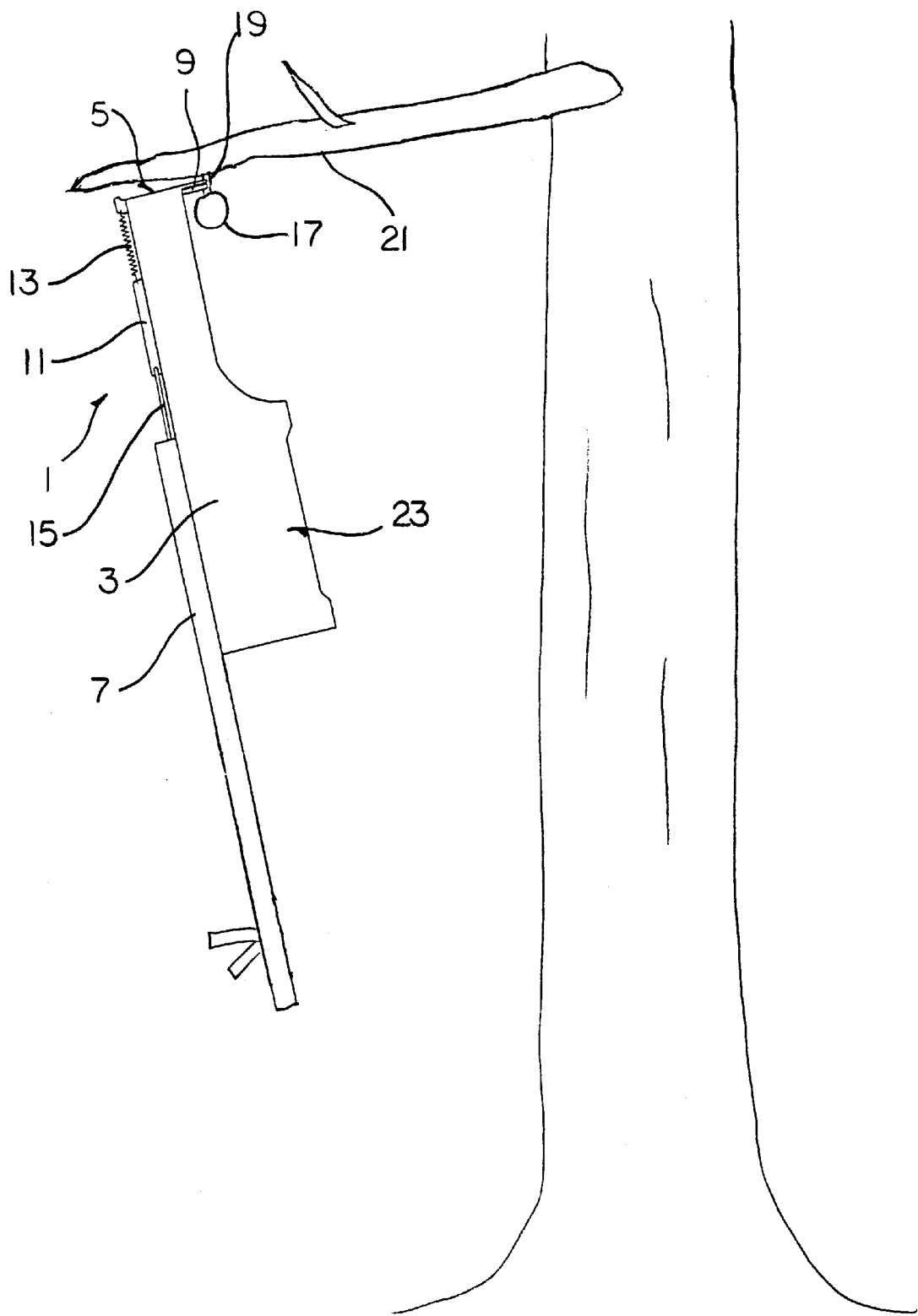
FIG. 1 is a schematic view of the present invention.
Figure 2:
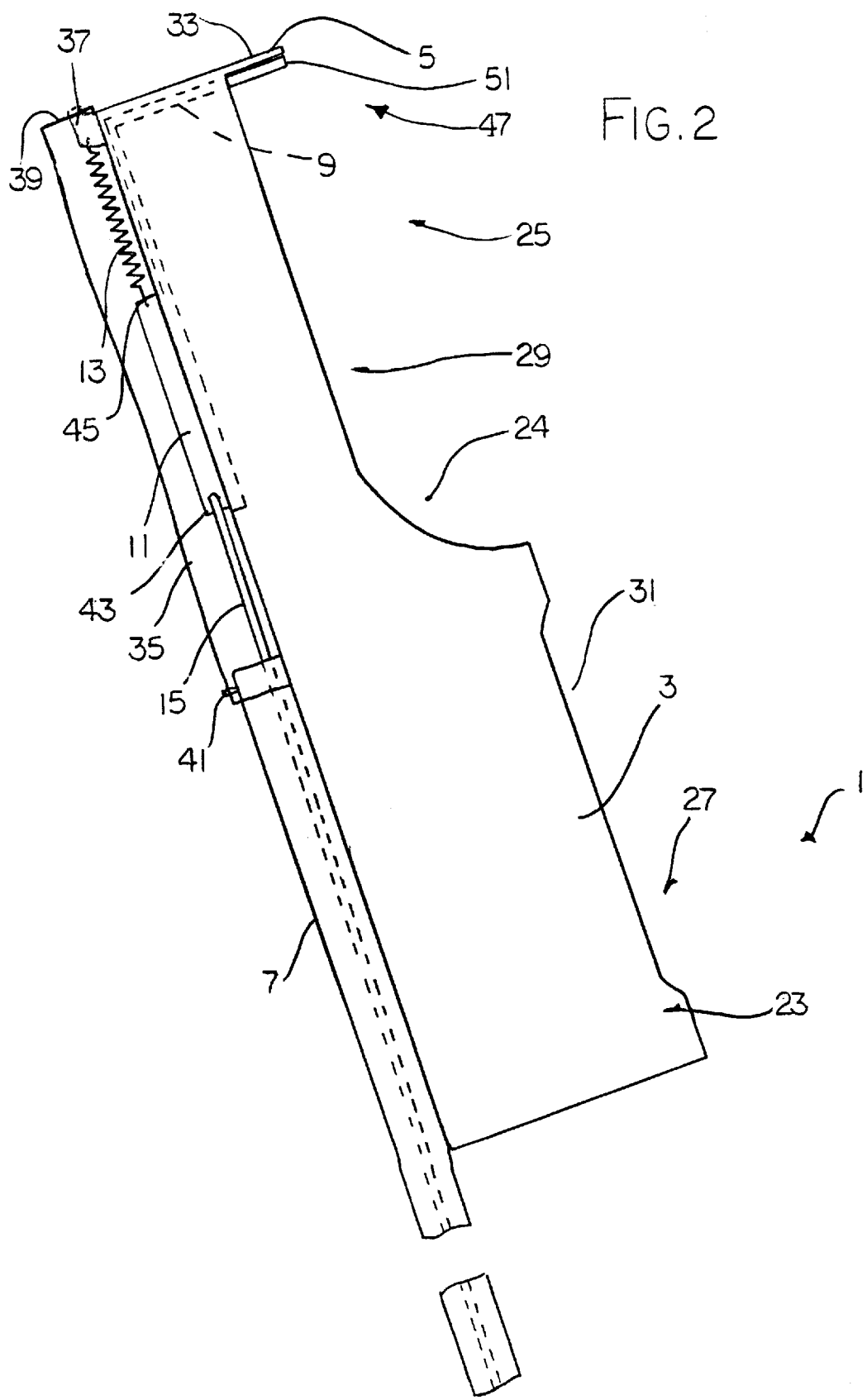
FIG. 2 is a side elevational view of the present invention in a closed or first position.

As illustrated schematically in FIGS. 1 and 2, a fruit picker 1 includes a tubular container 3 having a slotted end 5, a tubular handle 7 on the container and a slotted movable member 9 sliding within the container and held in position by a rudder 11 and a compression spring 13. The spring and a string 15 that is pulled through the tubular handle are attached to the rudder in order to activate the movable member. The slotted portions of both the container and the movable members are held close together by the compression spring unless the string is pulled against the force of the spring. A person raises the container to engage a piece of fruit 17 by bringing a stem 19 of the fruit into the slotted ends. The slotted end of the container holds a branch 21 in position and as the person pulls on the string the movable member slides within the container. The interior surface of the slotted end of the movable member exerts force against the fruit pulling the fruit away from the tree as the slotted member of the container engages the branch causing the stem to break, resulting in the fruit being separated from the branch falling into a lower portion 23 of the container.

Figure 3:
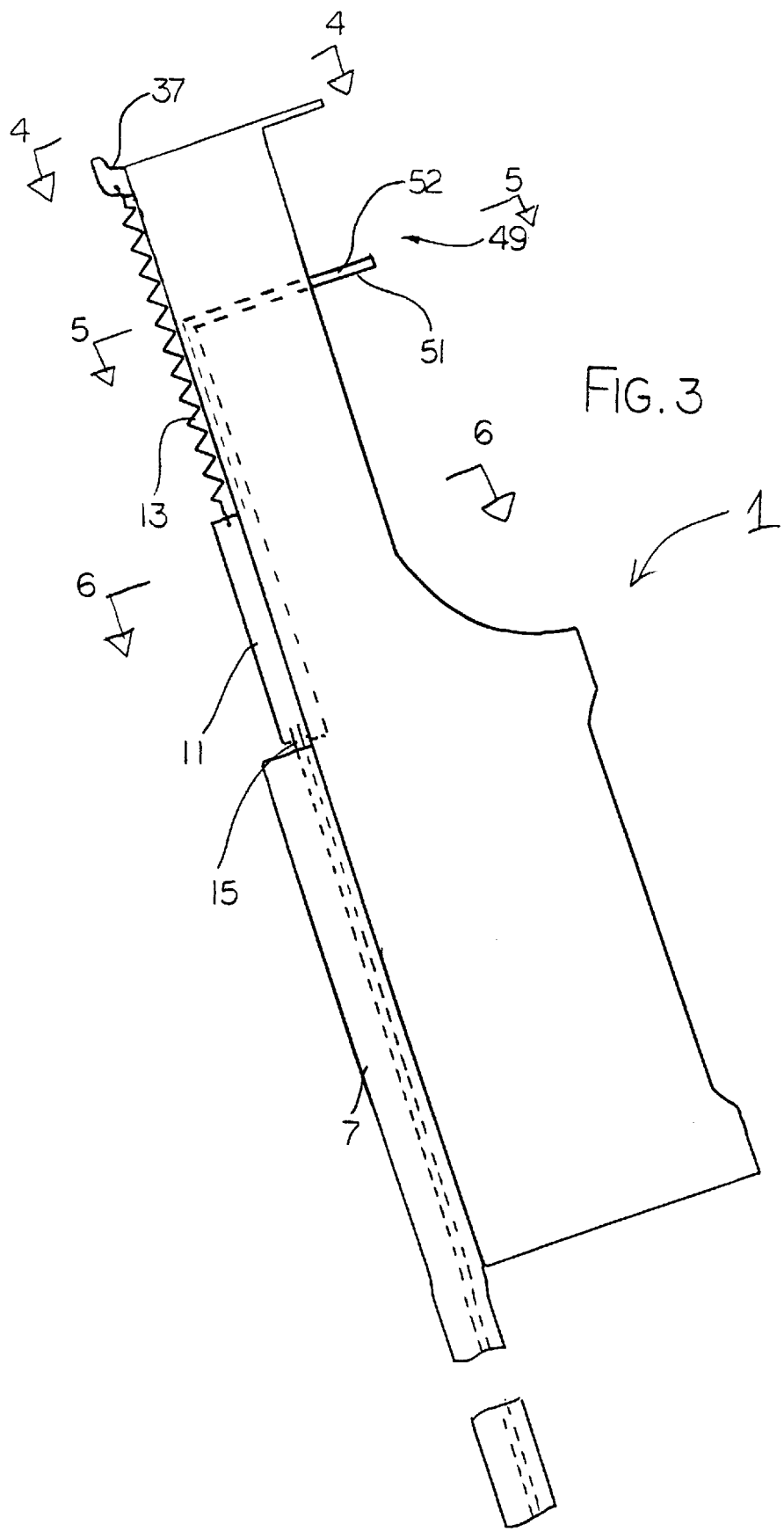
FIG. 3 is a side elevational view of the present invention in an open or second position.
Figure 7:
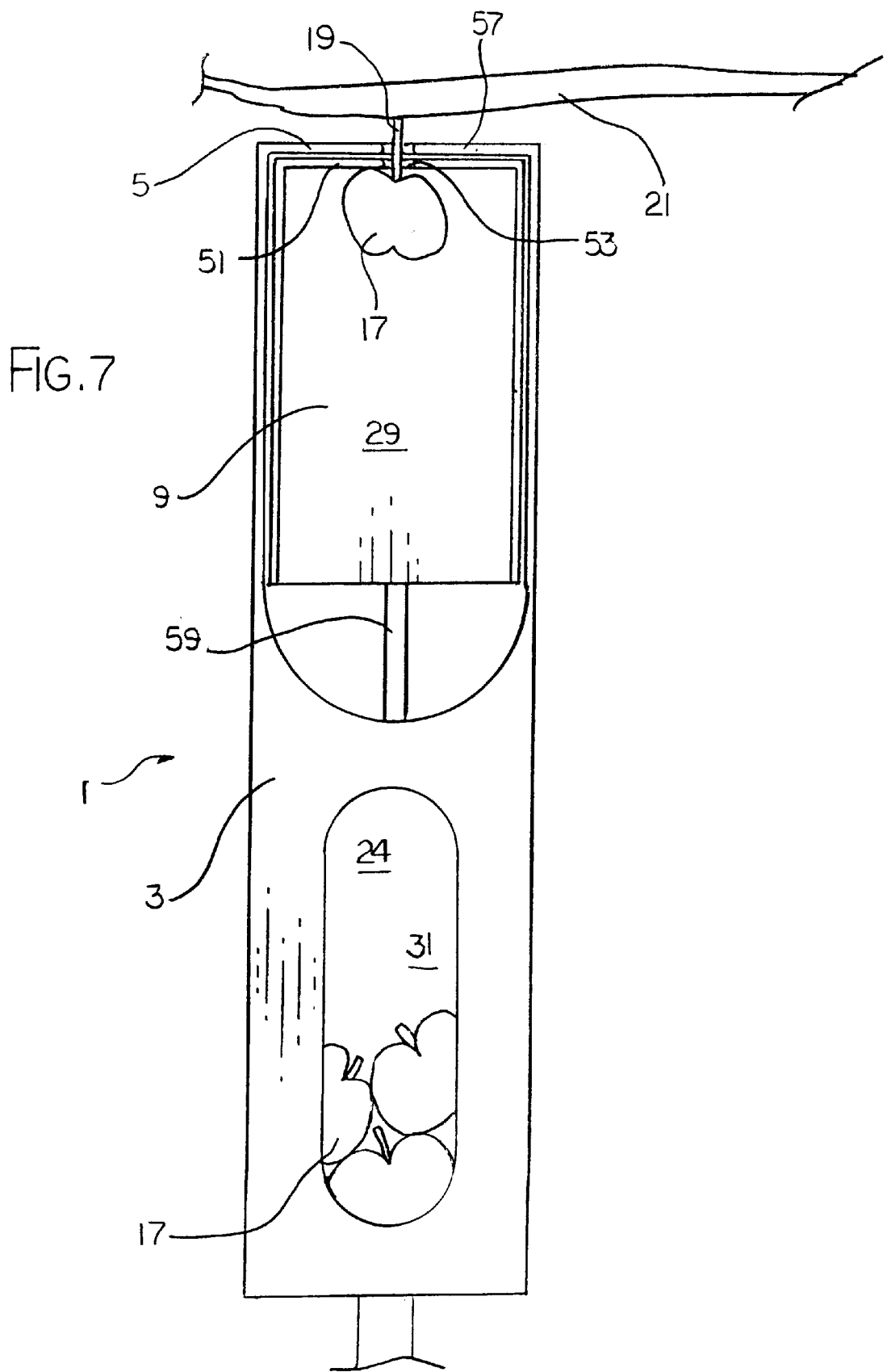
FIG. 7 is a top plan view of the present invention.

The fruit picker 1 is shown in detail in FIGS. 2, 3 and 7 wherein the container has a first end 25, defining a top end, a second end 27, defining the lower end 23 and a hollow interior 24. The first end has an opening 29 sufficiently large so that the fruit can be collected by the container. The second end has an open portion 31 so that an operator can observe the amount of fruit the person has collected within the container. The bottom end is enclosed so that the fruit is contained within the container. The slotted end 5 is located at the first end and has a lip 33 which extends outwardly beyond the opening 29, as described later in detail.

The tubular handle 7 extends downwardly from the container and is located on a respective side on the container opposite the opening and the open portion. A protective cover 35 is arranged to cover the rudder and the spring and has a closed end 39. The cover is semicircular in shape such that the cover fits around the handle and allow movement of the rudder. The cover is supported by a hook 37 which is mounted to the container at the first end opposite the opening and is inserted through the closed end and is secured to the handle by a pin 41.

The movable member 9 is located within the container, the rudder is attached to the movable member and extends out the container on the same side as the handle within the cover. The string is attached to a first end 43 of the rudder and extends downwardly within the handle. At a second end 45 of the rudder is the spring. The spring extends forwardly and is attached to the hook 37 for support. The string is arranged to be pulled by an operator which then stretches the spring and moves the rudder downwardly therefore moving the movable member within the container. The spring is arranged to create tension opposite the string so that the rudder and the movable member are returned to a first position 47 as shown best in FIG. 2. FIG. 3 shows the rudder in a second position 49 wherein the string is pulled such that the movable member is moved downwardly within the container and the spring is stretched. The fruit is picked from the tree by engaging the fruit at the slotted end 5 of the container and locating the fruit within the first end of the container. The string is pulled so that a slotted end 51, as described later in detail, of the movable member fits around the stem 19 of the fruit while the slotted member of the container supports the branch which breaks the stem and gently removes the fruit from the branch without disturbing the tree. The fruit then falls into the second end for holding until the container is full and is dumped into a suitable storage place for the fruit such as a wagon or trailer or the like. The stem is positioned between the slots on the slotted members such that the fruit is located within the container and the branch is located out of the container which is engaged by the slotted member of the container and the fruit is engaged by the slotted member of the slidable member. When the string is pulled the slotted member of the slidable member pulls the fruit away from the branch so that the stem is broken releasing the fruit into the container while the slotted member of the container engages the branch such that the two slotted members separate to pick the fruit.

The fruit is dumped by lowering the apparatus above the wagon or trailer and rotated so that the opening faces downwardly so the fruit is released from the container and so the operator can resume harvesting the fruit quickly and easily.

Figure 5:
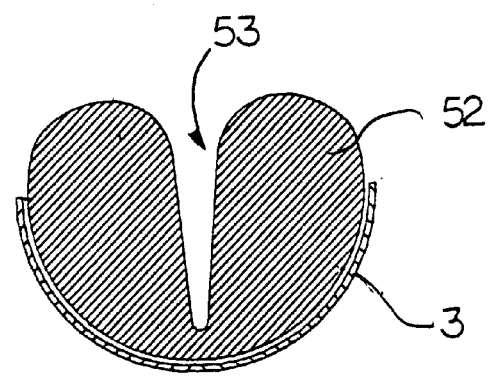
FIG. 5 is a horizontal cross section along the lines 5—5 in FIG. 3.

FIGS. 5 and 7 show the slotted end 51 of the moveable member. The slotted end 51 is a semicircular disk 52 and is arranged to correspond with the shape of the container 3. A slot 53 is tapered inward on the disk such that the stem on the fruit is inserted within the slot.

Figure 4:
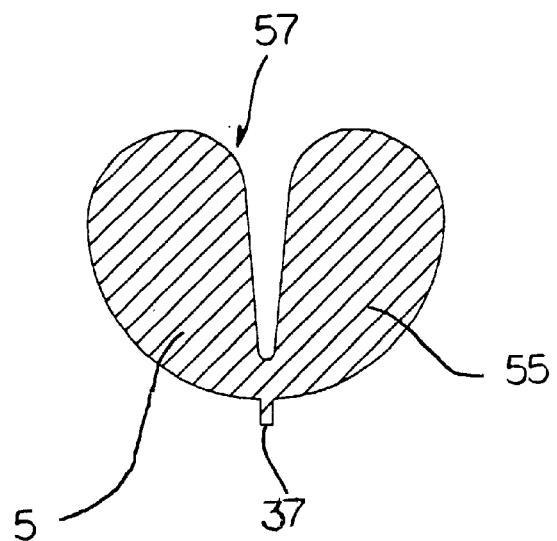
FIG. 4 is a view along the lines 4—4 in FIG. 3.

FIGS. 4 and 7 show the slotted end 5 of the container. The slotted end 5 has a second disk 55 is the same shape as and slightly bigger than the slotted end 51 and is mounted at the top end of the container such that the stem on the fruit is inserted within the slot. The tapered portion 57 of the disk is arranged to engage the branch of the tree so that the moveable member is pulled rearwardly and the branch is supported by the slotted end 5 and the stem is broken leaving the tree unharmed.

Figure 6:
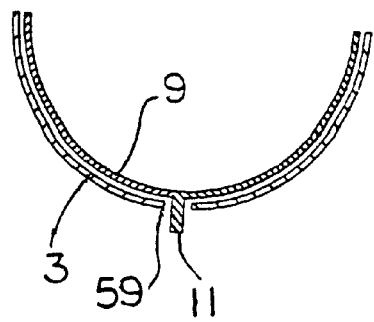
FIG. 6 is a horizontal cross section along the lines 6—6 in FIG. 3.

FIGS. 6 and 7 show the rudder 11 and the movable member 9. The rudder is guided by a slot 59 on the container which allows the movable member to be move upwardly and downwardly within the container.

FIGS. 8 and 9 show a handle 65 which is located at the bottom end of the tubular handle 7. The handle is arranged to pull on the string 15 as best shown in FIG. 9. When the handle is pulled a rear arm 67 on the handle raises upwardly from the tubular handle which pulls the string for actuating the slotted ends.

FIGS. 10 and 11 show another arrangement of a handle 69 which consists of a ball 71 which is attached to the string 15 at the end of the tubular handle 7. When the ball is pulled, as best shown in FIG. 11, the string actuates the slotted ends.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. An apparatus for picking fruit comprising;
an elongate tube in which fruit is collected;
a handle attached to the tube for enabling fruit to be picked from trees;
a first plate at a top end of the tube for engaging a branch, the plate having a slot arranged to receive a stem of the fruit;
a slidable member arranged to slide within the tube;
a rudder arranged to guide the slidable member within the tube;
and a second plate on the slidable member having a slot which is aligned with the slot on the first plate to receive the stem of the fruit,
the slidable member having a first position in which the second plate is adjacent the first plate and a second position in which the second plate is pulled rearwardly from the first plate,
whereby in first position the first plate engages the branch and the second plate engages the fruit so that the plates are located between the branch and the fruit and whereby in the second position the second plate pulls the fruit away from the branch as the first plate is positioned against the branch causing the stem to break releasing the fruit into the tube.

2. The apparatus according to claim 1 wherein a spring biases the slidable member to the first position.

3. The apparatus according to claim 2 wherein the spring is attached to the rudder and is arranged to stretch when the slidable member is pulled rearward into the second position and compress when the slidable member is in the first position.

4. The apparatus according to claim 1 wherein a string is attached to the rudder and extends through the handle for pulling the slidable member into the second position, the string having a pulling device at the end of the handle for pulling the string.

5. The apparatus according to claim 4 wherein the handle is a tube having a hollow interior in which the string extends therethrough.

6. The apparatus according to claim 1 wherein the tube has a containment portion wherein the fruit is contained and has an open portion so that an operator can see how much fruit has been picked.

7. The apparatus according to claim 1 wherein the rudder is attached to the slidable member and is located within a guide slot on the tube.

8. The apparatus according to claim 1 wherein the slidable member comprises a generally cylindrical portion contained within the tube.

9. The apparatus according to claim 1 wherein the tube and the slidable member have the end plates thereof substantially coextensive.

* * * * *